United States Patent
De Santis et al.

(10) Patent No.: US 10,915,476 B1
(45) Date of Patent: Feb. 9, 2021

(54) DATA TRANSFER DEVICE AND METHOD OF INTERFACING AND USING THE SAME

(71) Applicant: Datalogic IP Tech S.r.l., Lippo di Calderara di Reno (IT)

(72) Inventors: Stefano De Santis, Lippo di Calderara di Reno (IT); Luca Stanzani, Lippo di Calderara di Reno (IT); Alessandro Del Prete, Lippo di Calderara di Reno (IT); Riccardo Rosso, Lippo di Calderara di Reno (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 0 days.

(21) Appl. No.: 16/705,463

(22) Filed: Dec. 6, 2019

(51) Int. Cl.
*G06F 13/20* (2006.01)
*G06K 7/14* (2006.01)

(52) U.S. Cl.
CPC ........... *G06F 13/20* (2013.01); *G06K 7/1413* (2013.01); *G06F 2213/40* (2013.01)

(58) Field of Classification Search
CPC ... G06F 13/20; G06F 2213/40; G06K 7/1413; G06K 7/1417
See application file for complete search history.

(56) References Cited

U.S. PATENT DOCUMENTS

| | | | |
|---|---|---|---|
| 6,705,527 B1 * | 3/2004 | Kelly | G06K 17/0022 235/462.01 |
| 7,380,705 B2 | 6/2008 | Terlizzi et al. | |
| 7,480,138 B2 | 1/2009 | Kogan et al. | |
| 8,474,724 B2 | 7/2013 | Theile et al. | |
| 9,922,222 B2 | 3/2018 | Deal et al. | |
| 2007/0057063 A1* | 3/2007 | Zhu | G06K 7/10881 235/462.15 |
| 2009/0323133 A1* | 12/2009 | Koch | H04N 1/00206 358/474 |
| 2012/0131232 A1* | 5/2012 | Brownlow | G06F 13/4221 710/10 |
| 2016/0179705 A1* | 6/2016 | Barten | G06F 9/4411 713/2 |
| 2016/0274921 A1* | 9/2016 | Walker | H04L 25/03 |
| 2017/0017595 A1* | 1/2017 | Schnell | G06F 13/4022 |

* cited by examiner

*Primary Examiner* — Glenn A. Auve
(74) *Attorney, Agent, or Firm* — Shook, Hardy & Bacon L.L.P.

(57) ABSTRACT

Data transfer devices as well as methods of interfacing, configuring, and using the same are disclosed. Data transfer devices described herein allow a proper communication interface to be mounted on an input device, e.g., a scanner, connected to the data transfer device, enabling communication between the input device and a host device. The data transfer devices allow the input device to be configured for communication with the host device based on a particular type of connection, e.g., a particular hardware attachment that utilizes a particular communication interface. The data transfer device therefore enables "plug-and-play" connectivity between an input device and a host device that removes the amount of user-configuration or user-modification that is required to establish a connection or have the input device, e.g., scanner, mount a proper interface that is compatible with the data transfer device.

20 Claims, 6 Drawing Sheets

US 10,915,476 B1

DATA TRANSFER DEVICE AND METHOD OF INTERFACING AND USING THE SAME

CROSS-REFERENCE TO RELATED APPLICATIONS

This application is related to the application titled "A Detachable Adapter Device For Simplified Replacement of a Base Station For A Wireless Barcode Scanner," which is filed on the same date and is herein incorporated by reference.

BACKGROUND

An input device (e.g., a scanner useable for reading barcodes) is sometimes used with a specific communication interface that allows it to connect with a particular host device. The communication interface may utilize a specific physical layer or software layer that enables communication between the host device and the input device. In some instances, an input device may need to mount a particular interface in order to communicate with the host device to which it is connected. The mounting of this interface may require the input device, when attached to the host with a cable, to recognize the cable, in order to mount the proper interface. Host devices may utilize different cables to connect to an input device, each of which needs to be recognized by the input device to enable configuration of the proper interface at the input device. However, in cases where an input device is improperly configured for a particular cable, or is not able to detect a particular cable, an error occurs, and as a result, the input device may not recognize the cable, or the host device may not recognize the input device. In such cases, data cannot be transferred between the host device and the input device because the proper interface is not mounted. To fix this, a user must configure the input device, which can be inconvenient, impractical, or challenging. Further, implementing additional cable-specific interfaces at the software and hardware level on an input device results in significantly increased cost and complexity at the scanner and interface level, which may be impractical for economic purposes.

SUMMARY

This summary is provided to introduce a selection of concepts in a simplified form that are further described below in the detailed description section of this disclosure. This summary is not intended to identify key features or essential features of the claimed subject matter, nor is it intended to be used as an aid in determining the scope of the claimed subject matter.

In brief, and at a high level, this disclosure describes, among other things, a data transfer device and method of interfacing, configuring, and assembling the same. The data transfer device is connected to an input device and to a host device, allowing communication between the input device and the host device. For example, the data transfer device allows the input device to be configured for communication with the data transfer device and setup a communication with the host device based on a particular type of connection (e.g., a particular cable that utilizes a particular protocol/communication interface supported by the host device). The data transfer device therefore enables "plug-and-play" connectivity between an input device and a host device, and reduces or limits the amount of user-configuration or user-modification that is required to establish a connection, considering that the input device is not able to connect directly to the host device. The data transfer device may enable "plug-and-play" connectivity, which may include configuring the input device for communication with the data transfer device without user input. The reduction of the number of interfaces supported by the input device, because of the capability to use data transfer devices to extend the connectable host interface, helps to reduce manufacturing complexity and the cost of the input device. In other words, the data transfer device may be provided as a separate, connectable component that establishes a connection between an input device and a host device using a particular hardware configuration and a particular communication interface, in contemplated embodiments.

Throughout this specification, reference is made to an input device, which may be, for example, a scanner, a handheld scanner, a barcode reader, a radio-frequency identification ("RFID") Reader, an optical reader, or other device that can be used to receive or capture input, including a hard-wired or wireless version of such a device. The data transfer device may include an adapter component attachable to an input device and to a host device. Throughout this specification, a reference is made to an adapter component, which can be any combination of hardware, software, or computing components that allow a communication connection to be formed between a host device and an input device. In some embodiments, the data transfer device may include, for example, input and output terminals, drivers to enable communication, or any combination thereof. Also, throughout this specification, reference is made to a host device, which may be, for example, a point-of-sale device, a cash register, a personal computer, or other device that receives, processes, and uses data sent via an associated input device. A host device, as described herein, may include or utilize one or more processors, memories, input/output ports or connections, or other components that support the operation of the host device and its connection to other devices.

The data transfer devices described herein may take the form of a cable, cord, box, or other physical communication component, link, or structure, and may incorporate or utilize an adapter component that can be connected to an input device and to a host device using respective interfaces suited for those devices. The data transfer device may also incorporate or utilize a particular configuration component with a list of configuration settings that enables communication with a specific host device. The data transfer device may be configured to enable an input device to recognize the data transfer device by sending a plurality of initial communications (e.g., handshake configurations) to the input device once the data transfer device and the input device are connected. In response to the sending of the initial communications, the data transfer device may receive an acknowledgement (e.g., an unique communication) from the input device that indicates a communication channel is open. When the communication channel is open, the data transfer device may then communicate to the input device the parameters that are used in the communication between the data transfer device and the input device, so that the input device can mount the communication interface (e.g., to enable communication with the data transfer device, which may act as a transceiver or bidirectional interface in various contemplated embodiments). Following the mounting of the communication interface on the input device, the data transfer device may then receive an indication that the input device has applied the configuration settings to mount at least part of the communication interface. Through the use of the plurality of initial communications and the subsequent interface mounting, the data transfer device may allow the communication with the input device with reduced, limited, or no user input and allow the transfer of data information from input device to the host device.

In some contemplated embodiments, the data transfer device may also allow the transfer of data or commands from the host device to the input device. In some embodiments, the communication between the input device and the host device becomes bidirectional. In such an embodiment where the communication between the input device and the host device becomes bidirectional, the data transfer device may include an adapter component, a configuration component, an at least one processor, a memory, or some combination of the same. The memory and processor may be components of a logic component, configured to process, store, and facilitate communication between the input device and host device. The memory may be external memory, can be embedded in programmable logic (field-programmable gate array ("FPGA") or complex programmable logic device ("CPLD")), or in any component that can implement processors or memory. The adapter component may be configured to be attached or connected to the input device and to a host device through the respective interfaces, such as, for example, suitable hardware interfaces. The configuration component may be used to enable communication with the host device in a data format recognized by the host device.

The data transfer device may be configured to: (1) send initial communications to the input device; (2) receive, in response to the initial communications, an acknowledgement indicating that a communication channel with the input device is open; (3) communicate to the input device the configuration settings (e.g., settings for the communication interface) used by the data transfer device to communicate with the input device; (4) receive an indication that the input device has applied the configuration settings to mount the communication interface from variable communication interfaces to enable the input device to receive commands from the data transfer device using the communication interface; and (5) enable a communication channel with the host device using a data format suitable for the host device.

In one embodiment, a data transfer device is provided that includes an adapter component, a configuration component, and a logic component comprising an at least one processor. The adapter component may be attachable to an input device and to a host device. The at least one processor may be coupled to a memory. The configuration component may include configuration settings to enable communication with the input device. For example, the configuration component may enable communication used to enable communication via the adapter component to the input device and towards the host device in a data format recognized by the input device and the host device respectively. The data transfer device is configured to send initial communications to the input device and receive, in response to the initial communications, an acknowledgement indicating that a communication channel with the input device is open. The data transfer device may communicate to the input device the configuration settings used by the data transfer device to communicate with the input device. The data transfer device may receive an indication that the input device has applied the configuration settings to mount the communication interface from available communication interfaces stored on the input device to thereby enable communication with the data transfer device.

In another embodiment, a method for interfacing a data transfer device to an input device is provided. The method may include sending, by a data transfer device, a plurality of initial communications to the input device. In response to the plurality of initial communications, an acknowledgement may be received, indicating that a communication channel with the input device is open. The configuration settings used by the data transfer device to communicate with the input device may be sent to the input device. An indication that the input device applied the configuration settings to mount a communication interface between the data transfer device and the input device may be received. In some embodiments the communication interface applied by the input device may be a communication interface of a plurality of available communication interfaces stored on the input device.

In another embodiment, a system for a data transfer device to interface with an input device is provided. The system includes the data transfer device configured to send a plurality of initial communications to the input device. In response to the plurality of initial communications, the data transfer device is configured to receive an acknowledgement that a communication channel is open with the input device. The data transfer device is configured to send the configuration settings to the input device to communicate with the input device. The data transfer device is configured to receive an indication that the input device has applied the configuration settings to mount a communication interface between the data transfer device and the input device from a plurality of available communication interfaces stored on the input device.

BRIEF DESCRIPTION OF THE DRAWINGS

The present subject matter related to data transfer devices as well as methods of interfacing and using the same is illustrated by way of example and not limitation through the accompanying figures, in which like reference numerals indicate similar elements, wherein.

DETAILED DESCRIPTION

Figure 1:
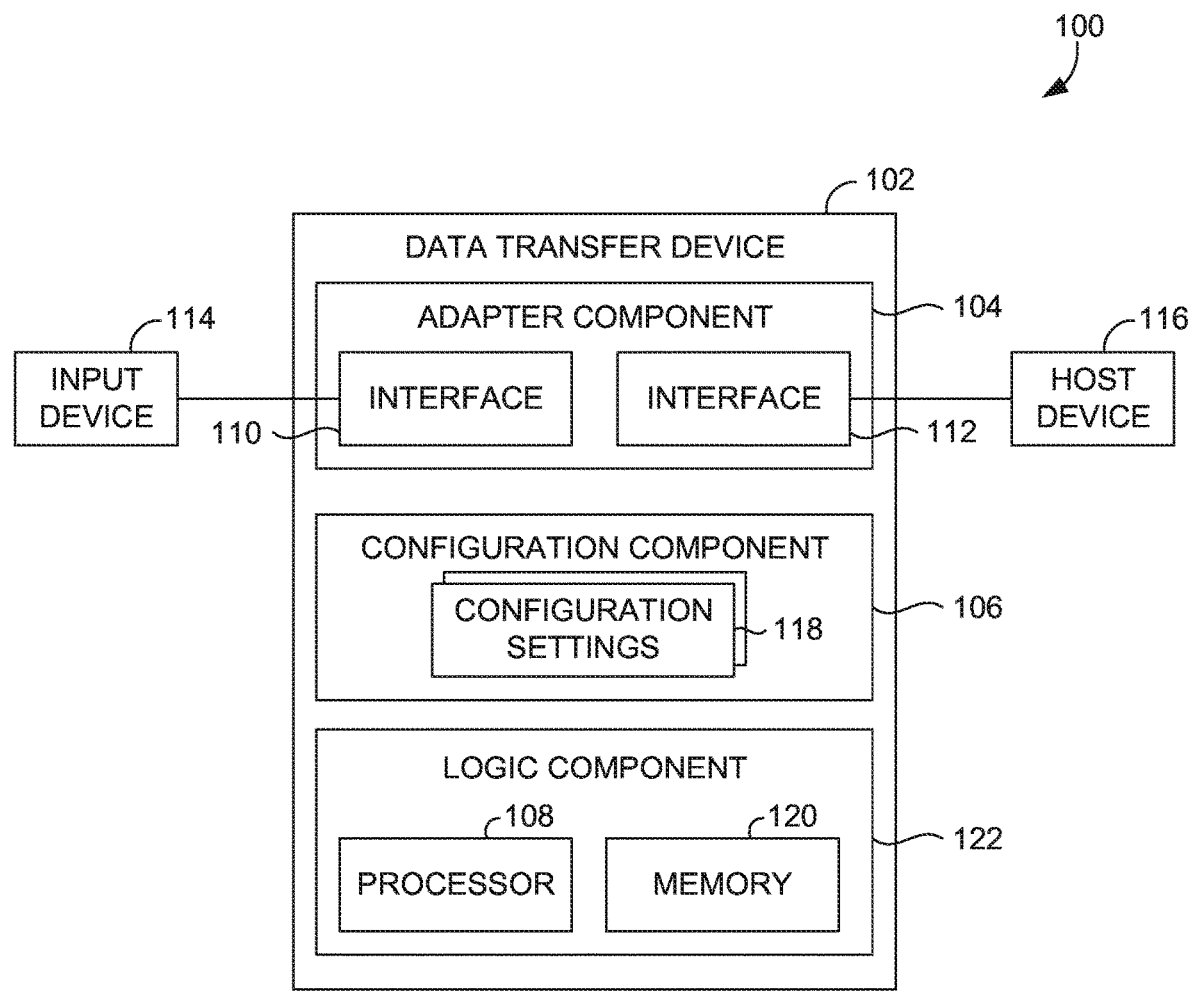
FIG. 1 depicts an exemplary arrangement of a data transfer device, in accordance with an embodiment of the present invention.

The subject matter of embodiments of the present invention is described with specificity herein to meet statutory requirements. However, the description itself is not intended to limit the scope of this patent. Additionally, the application titled "A Detachable Adapter Device For Simplified Replacement of a Base Station For A Wireless Barcode Scanner," which is owned by Applicant and filed on the same date, is herein incorporated by reference.

The claimed subject matter may be embodied in other ways to include different elements, steps, or combinations of elements and steps, similar to those described in this disclosure, and in conjunction with other present or future technologies. Although the terms "step" and "block" may be used herein to connote different elements of various methods employed, the terms should not be interpreted as implying any particular order among or between various steps or blocks unless and except when the order of individual steps or blocks is explicitly described and required.

In general, embodiments of the present disclosure relate to data transfer devices and a method of interfacing configuring, and using the same. The data transfer device in operation may be mounted on an input device as a part of or an attachment to the input device or the data transfer device may be external to the input device. The input device may be connected to the data transfer device as described herein. The data transfer device enables the communication between the input device and a host device. This communication happens over an interface that is available both in the adapter component of the data transfer device and in the input device (as one of the possible interfaces stored on the input device).

The data transfer devices described herein may interchangeably be referred to as adapter boxes or integrated adapter boxes ("IABs"), or as active cables, although "box" and "cable" are not intended to limit the structure or configuration of the data transfer device and components thereof. The data transfer device may be non-integrally formed with the input device, or stated differently, the data transfer device may be formed to be physically separate from the input device, rather than fixedly incorporated into the input device's structure.

Data transfer devices as described in various embodiments herein may perform a variety of functions and provide a variety of benefits. Typically, input devices implement a cable detection to load the correct interface to be used with a host device. The input device then must mount several interfaces to be used with a host device to keep the possibility of connecting to the host device. The use of the term mount may describe the input device receiving, changing, or implementing settings of the input device to the communication interface communicated by the host device, which in some embodiments may include configurations settings. The use of a data transfer device reduces the number of interfaces mounted on input device keeping the possibility to connect to host device. Reducing the number of interfaces reduces the cost and complexity of the input device, simplifying the cable detection mechanism. For example, when an input device, such as, in one example, a barcode scanning device, has incorporated therein a data transfer device, the input device may need to use its internal processor to apply a plurality of configuration settings, and then mount the communication interface, which may slow down the operation of the input device, require a faster performing processor, or increase the cost of the input device. This configuration, while presenting a solution for proper communication interface mounting on an input device, can increase the cost, complexity, and manufacturing requirements for such devices and may not be preferable, and rather, a solution that utilizes a separate, connectable component for proper communication and configuration may be advantageous, as described with respect to the embodiments presented herein.

The data transfer devices described herein may in some embodiments automatically select a communication interface for the input device. One advantage of this is that it allows for a "plug-and-play" configuration between the data transfer device and the input device, as the communication interface with the input device is selected and configured by the data transfer device rather than need user interaction. The data transfer device reduces the number of communication interfaces mounted by an input device, by configuring the proper communication interface via the methods, systems, and uses described herein. Reducing the number of communication interfaces mounted by the input device may reduce the complexity of input devices and reducing cost. In some embodiments, configuring the proper communication interface may be facilitated by the limited number of interfaces available for the input device. The automatic configuration may be achieved by submitting initial communications to open a bidirectional channel between the data transfer device and the input device, which may allow the configuration of the interface between the data transfer device and the input device without interaction by a user.

This disclosure refers frequently to "communication interfaces" or simply to "interfaces" used to enable communication between various components (e.g., the input device, the data transfer device, and the host device). In this respect, the communication interface may include in different embodiments a physical layer, software layer, or both, that support communication between an input device, a data transfer device, or a host device. For example, a communication interface may utilize baudrates, parity, start and stop bits, packets, or other various other forms of communication formats to allow communication between devices.

Now referring to FIG. 1, an exemplary system 100 having a data transfer device 102 is provided, in accordance with an embodiment of the present invention. The data transfer device 102 includes an adapter component 104, a configuration component 106, and a logic component 122. The adapter component 104 may be configured to provide a connection to an input device 114 and to a host device 116 through the respective interfaces 110, 112 incorporated with the adapter component 104. The adapter component 104, as shown in FIG. 1, includes the interface 110 that is connectable to the input device 114 so as to provide a communication connection with the input device 114. The adapter component 104 also includes the interface 112 that is connectable to the host device 116 so as to provide a communication connection with the host device 116. The configuration component 106 may include a list of configuration settings 118. The configuration settings 118 may be used by the data transfer device 102 to enable communication with the host device 116, in order to configure interface 112 in a data format recognized by the host device 116. The configuration settings 118 may be used by data transfer device 102 to configure the input device 114 in order to enable communication between the input device 114 and the data transfer device 102.

Further, the data transfer device 102 may configure the input device 114, realizing a "plug-and-play" connection and setting up a communication between the input device 114 and the host device 116. The input device 114 may not communicate with the host device 116 because the input device 114 may not mount the interface 112 because it may not be included in its available interfaces. The data transfer device 102, therefore, may autonomously communicate and configure the input device 114 via the interface 110. The data transfer device 102 can set up the interface 112 to communicate with the host device 116, using configuration component 106 to configure the interface 112. This configuration of the interfaces 112 and 110 allows the communication from input device 114 to host device 116 that originally may not have been possible.

For example, to enable setup, the adapter component 104, when connected to the input device 114, may enable sending initial communications from the data transfer device 102 to the input device 114 via interface 110. The input device 114 sends an acknowledgement to the adapter component 104, in response to sending the initial communications. In some embodiments the acknowledgement may be a unique communication from the input device 114 to the adapter component 104. In some embodiments the acknowledgement or initial communications are processed by the logic component 122. The acknowledgement may indicate that a communication channel is open between the input device 114 and the adapter component 104. In some embodiments, the acknowledgement may comprise specific configuration settings 118 associated with interface 110. In some embodiments, the configuration settings 118 may comprise a baudrate, parity, databits, start and stop bits, or some combination of specific data formats. The adapter component 104 may use configuration settings 118 to set up the interfaces 110 and 112 and to communicate with the host device 116 and the input device 114 respectively. The adapter component 104 may receive from the input device 114 an indication that the input device 114 has applied the configuration setting to mount the interface 110 or a portion thereof. In some embodiments, the logic component 122 may process and manage communications via each of the components, interfaces, and devices.

The data transfer device 102 may implement only one interface as interface 110 and only one interface as interface 112. Implementing only one interface allows the input device 114, that supports communication over the interface 110, to communicate with the host device 116 via interface 112, even if the input device 114 may not directly support the interface 112.

In some embodiments, a plurality of interfaces (such as interfaces 110 and 112) may be available for different input devices (such as input device 114) and may be implemented by different data transfer device 102. In some embodiments the interfaces 110 and 112 may be a protocol interface. For example one data transfer device 102 can use, as interface 110, the RS232 interface and as interface 112, the Ethernet interface. In one embodiment, the data transfer device 102 can use as interface 110 a USB interface and as interface 112 can be a personal system connection ("PS2") to support a keyboard wedge interface.

In some embodiments, the interfaces 110 and 112 may enable bidirectional communication between the input device 114 and the host device 116. In some embodiments, data may be transferred between the input device 114 and host device 116, as well as from the host device 116 to the input device 114 once the communication is established. For example, machine-readable indicia may be transferred from the input device 114 to the host device 116 via the methods described within. Similarly, a response may be transferred from the host device 116 to the input device 114 as a result of the machine-readable indicia being transferred. However, in some embodiments the interfaces 110 and 112 may be monodirectional between the input device 114 and host device 116. In some embodiments data may be transferred from the input device 114, to the host device 116.

In some embodiments the interfaces 110 and 112 may be a hardware or software connection to the input device 114 and the host device 116. The interfaces 110 and 112 may be a hardware connection which may include any physical connection with the input device 114 and the host device 116. For example, the hardware connection may be a corded connection. The interfaces 110 and 112 may be a software connection which may include any software or wireless connection with the input device 114 and the host device 116. For example, the software connection may be Bluetooth signals or Wi-Fi.

The interface 112 may include physical and software layers ("communication protocols"). The software layers may interface 112 can be implemented with the logic component 122 or in some cases the processor is not needed depending on specific interface 112 implemented in the embodiment of data transfer device 102. The embodiments where processor is not needed to implement software layer for interface 112 is when physical layer from interface 110 and interface 112 is similar.

The data transfer device 102 may act as a transceiver. In such an embodiment, many or all layers of the communication protocol of interface 112 are implemented by the input device 114. In some other embodiments, when the data transfer device 102 acts as a transceiver, the data transfer device 102 may implement one or more layers of the communication protocol. For example, the data transfer device 102 may implement only the lowest level, the physical layer.

The data transfer device 102 may also operate as a bidirectional interface to send and receive information. In these embodiments, the input device 114 through this operation may not need to know any detail of the implemented interface 112 of the data transfer device 102 used to enable communication with the host device 116.

In some embodiments, the logic component 122 may perform or communicate with each of the functions of the adapter component 104, the configuration component 106, or any other functions, devices, or components of the data transfer device 102. The logic component 122 may include a processor 108 and a memory 120. In some embodiments, the logic component 122 may include multiple processors 108 to achieve these described functions and features. The at least one processor 108 may comprise a micro-controller adapted to control functions associated with the data transfer device 102. In some embodiments the logic component 122 may include the processor 108 coupled to the memory 120. For example, the micro-controller may govern specific operations of the data transfer device 102 such as sending the configuration settings 118, receiving data from the input device 114 (such as decoded labels) or transmit data to host device 116.

The input device 114 may be a device configured to detect and read machine-readable indicia, such as a barcode scanner. In some embodiments, the input device 114 may be a wireless barcode reader. The input device 114 in some embodiments, may be a wireless barcode reader in combination with a cradle configured to operate as an integrated unit. In embodiments where the input device 114 is an integrated unit of a cradle and wireless barcode reader, the cradle may connect directly to the adapter component 104 and may connect via the interface 110. In these embodiments, the cradle may relay all data of the wireless barcode reader. The input device 114 may comprise a scanner configured for scanning machine-readable indicia wherein the input device 114 may be non-integrally formed with the scanner.

The input device 114 may support a plurality of interfaces to be used on interface 110. Each of the plurality of communication interfaces may be used to communicate with the data transfer device 102 but the data transfer device 102 has only one specific interface 110 in every embodiment. When the input device 114 detects the initial communication phase of data transfer device over interface 110, the input device 114 may select the interface 110 to mount from a plurality of communication interfaces stored on the input device 114.

Each of the interfaces 110 and 112 may include a physical or software layer of communication. The physical layer may describe the physical interface for communication with the host device 116 or input device 114. For example, the physical layer may be RS232, USB, or Ethernet communications. The physical layer of the interfaces 110 and 112 may be different for each interface(s) 110 and 112. The software layer may describe the software interface for communication with the host device 116 or input device 114. For example, the software layer may be the software requirements of USB, Ethernet, or RS232 communication. The software layer of the interfaces 110 and 112 may be different for each interface(s) 110 and 112.

The input device 114 may also be configured with a plurality of configuration settings 118. Each of the plurality of settings may control various embodiments of the input device 114. Some settings may be configured to enable a setting or disable a setting. For example, some settings may control various communication configuration items such as flow control type, baudrate, parity, and other similar communication embodiments. Each command from the data transfer device 102 may include at least one of an enable setting of the input device 114, and a disable setting of the input device 114.

The host device 116 may be any receiver of data obtained by the input device 114. In some embodiments, where the input device 114 is a wireless barcode reader, the host device 116 may be a point-of-sale ("POS") device useable with the input device 114. Example POS devices include cash registers, or any place where a retail transaction may occur. The host device 116 in some embodiments, may communicate via an IBM46xx interface or using a USB, PS2, 485, or RS232, among other interfaces. Each interface may include physical and software layers to enable communication between the input device 114 and the host device 116.

Figure 2:
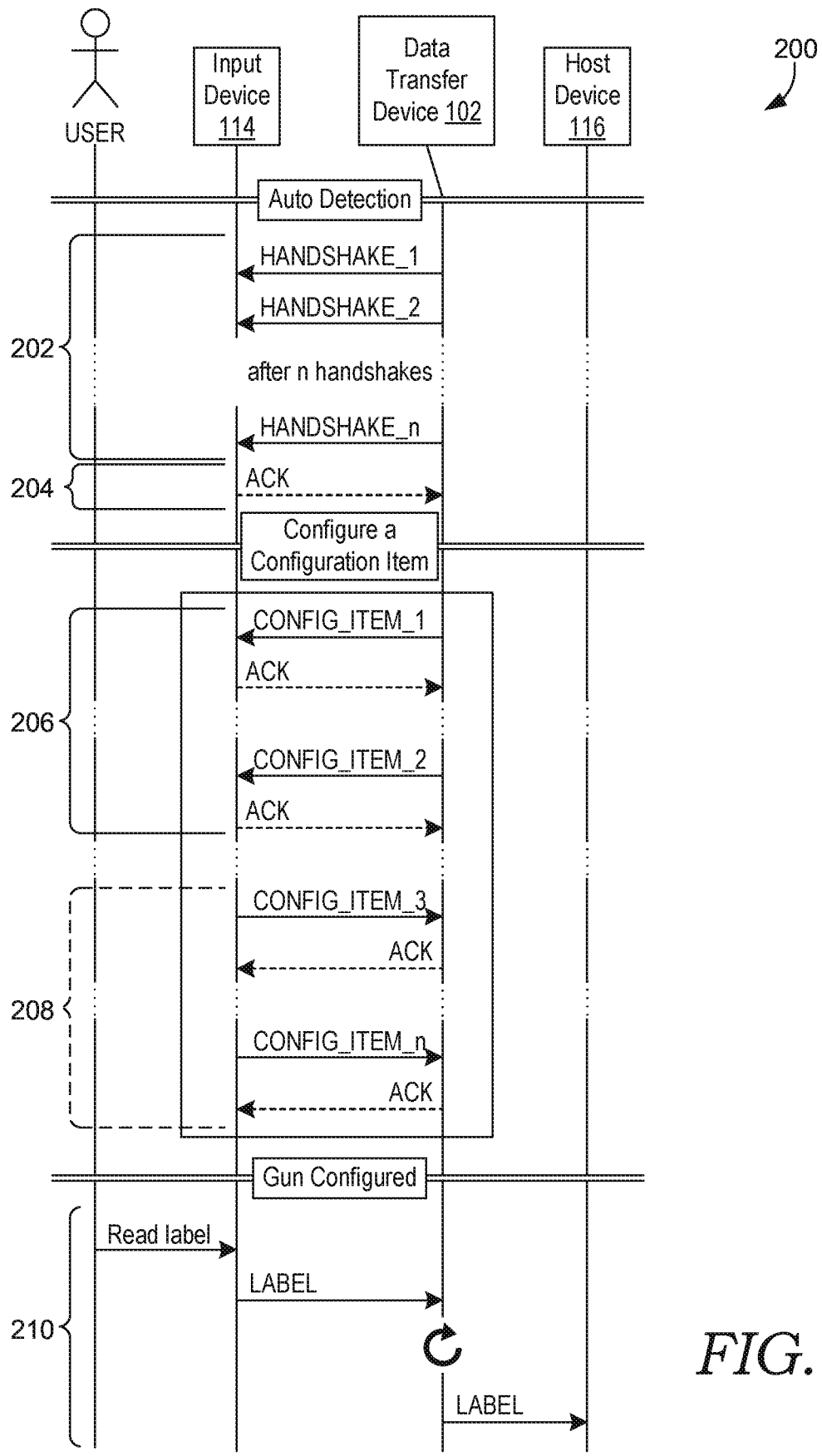
FIG. 2 depicts an exemplary setup process for configuring an input device to enable communication with a data transfer device and a host device, in accordance with an embodiment of the present invention.

FIG. 2 depicts an exemplary process 200 for configuring an input device 114 such as, for example, the input device 114 shown in FIG. 1, in accordance with an embodiment of the present technology. The process 200 utilizes a data transfer device, such as the data transfer device 102 described in FIG. 1. The process 200 represents, as an example, interactions between the input device 114, the data transfer device 102, and the host device 116 shown in FIG. 1.

The first block 202 in the process 200 may be referred to as auto-detection. At block 202, the data transfer device 102 may send initial communications to the input device 114. In some embodiments, the initial communications may be a set of handshake packets. In the process 200 of FIG. 2, the handshake packets include HANDSHAKE_1 and HANDSHAKE_2 with "n" additional handshakes. In some embodiments, the handshake packet may be an automated process to determine exact communication frequency and establishes a communication link.

In some embodiments, each of the initial communications may be at one of a plurality of configuration settings 118 for interface 110. For example, some initial communications may be for interfaces such as RS232, can be sent at a specific baudrate, parity, start and stop bit or some combination thereof. In this example, the baudrates for RS232 such as 9600, 57600, 115200 may be communicated as handshakes. Many micro handshakes may also occur at 1 Mps intervals until an acknowledgement is received by the data transfer device 102. In some embodiments, where no acknowledgement is received, or baudrates are not included in the handshake, a 115200 baudrate may be used.

The auto-detection portion of the process 200 also includes block 204 as shown in FIG. 2. At block 204, the data transfer device 102 has received an acknowledgement from the input device 114. The acknowledgement indicates that a communication channel with the input device 114 is open or at least partially established. For example, in embodiments where the initial communications are handshakes, the input device 114 may accept a handshake packet which may be the acknowledgement. In some embodiments, the initial communications may not be accepted by the input device 114, in other words, the input device 114 may ignore initial communications when it is not capable of receiving or configuring.

At block 206, at least one configuration communication may be sent to the input device 114. Each configuration communication may include communication settings (such as configuration settings 118 of FIG. 1) to be set by the input device 114. The input device 114 may submit an acknowledgement when the communication settings are set (e.g., the communication settings are applied). The configuration setting may include a series of configuration items. As shown in FIG. 2, CONFIG_ITEM_1 and CONFIG_ITEM_2 are communicated to the input device 114 from the data transfer device 102. In response, the input device 114 may submit an acknowledgement that the configuration items have been set. In some embodiments, receiving the acknowledgement that the configuration items have been set may close the setup phase.

In some embodiments, the data transfer device 102 may communicate the configuration communication used by the data transfer device 102 to communicate with the input device 114. For example, the configuration communication may include the configuration settings 118. The input device 114 may then mount communication interface (applying communication settings) to configure the interface 110 from the available communication interfaces that may be stored on the input device 114. By mounting the interface 110, the input device 114 may thereby enable communication with the data transfer device 102. The input device 114 may submit an indication to the data transfer device 102 that the input device 114 has updated the configuration (e.g., applying the received configuration setting).

In some embodiments, at block 208, at additional configuration communications are received from the input device 114. Each additional configuration communication may include at least one configuration communication comprising configuration settings 118 to be set by the data transfer device 102. The data transfer device 102 may submit an acknowledgement when the configuration settings 118 are set. The configuration settings 118 may include a series of configuration items. As shown in FIG. 2, CONFIG_ITEM_3 and CONFIG_ITEM_n are communicated from the input device 114 to the data transfer device 102. In response, the data transfer device 102 may submit an acknowledgement that the configuration items have been set. In some embodiments, receiving the acknowledgement that the configuration items have been set may close the setup phase, however this may be optional and may not occur or may not be necessary in some contemplated embodiments.

It is noted that block 206 and block 208 are presented from two different perspectives of receiving and sending data from the input device 114. When the configuration is received, the data transfer device 102 may submit an acknowledgement. When the configuration is submitted, the input device 114 may submit an acknowledgement. Each acknowledgement may be sent from a different element in these alternative embodiments.

In some embodiments, each of the configuration settings 118 may be additional settings that are not necessary to enable communication with the input device 114. However the additional settings may enhance communication with the input device 114. For example, some configuration settings 118 may enable a flow control to increase the robustness of communication between the input device 114 and data transfer device 102.

The gun configured block may include block 210. At block 210, the gun may refer to the input device 114. At block 210, the interfaces 110 and 112 may be mounted, in some embodiments according to the process 200. At block 210, the input device 114 may be used to read a barcode (e.g., "read label") or perform another operation that generates data communicated to the host device 116 in a format recognized by the host device 116. In operation, a user may use the configured input device 114 to read a label. The input device 114 may relay the label (e.g., as decoded data) to the data transfer device 102. The data transfer device 102 manages low-level communication with the host device 116. The label is submitted to the host device 116 by way of the data transfer device 102. The host device 116 receives the data because the input device 114 and data transfer device 102 are seen as a single unit. For example, the input device 114 may be used to read the barcode and exchange data with the host device 116. When data is exchanged, the data may include the barcode, a label, indicia, firmware, video, image, commands, or any other data between the input device 114 and host device 116.

Although FIG. 2 describes various blocks, in some embodiments additional or fewer blocks may be implemented.

Figure 3:
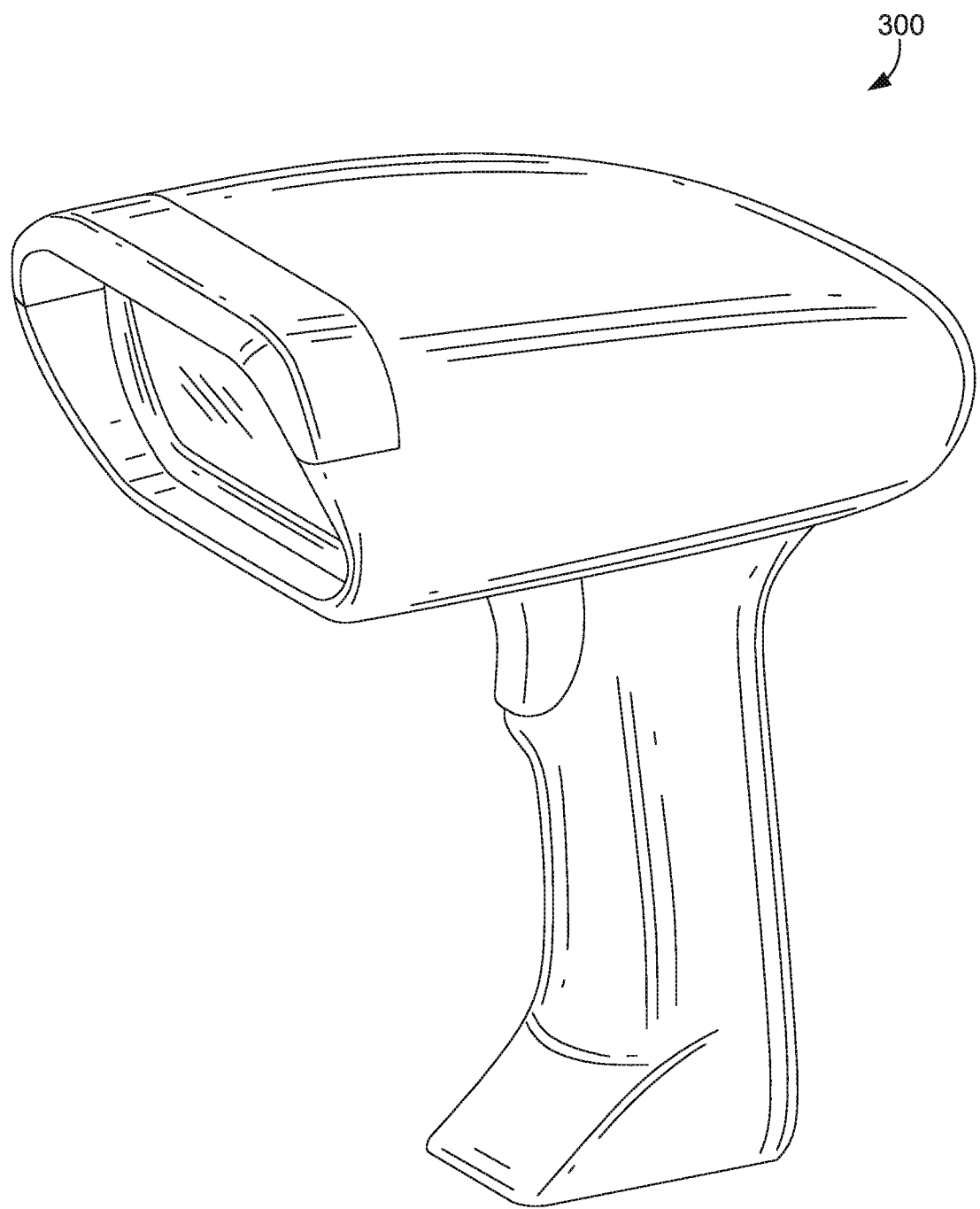
FIG. 3 depicts an exemplary input device in the form of a scanner, in accordance with an embodiment of the present invention.

Turning now to FIG. 3, a handheld scanner 300 is shown, in accordance with an embodiment of the present technology. In some embodiments contemplated herein, the input device, such as, for example, the input device 114 shown in FIG. 1, comprises the handheld scanner 300. The input device 114 may be any device configured for reading a barcode in one contemplated embodiment. For example, the input device 114 may comprise a scanner configured for scanning machine-readable indicia.

Figure 4:
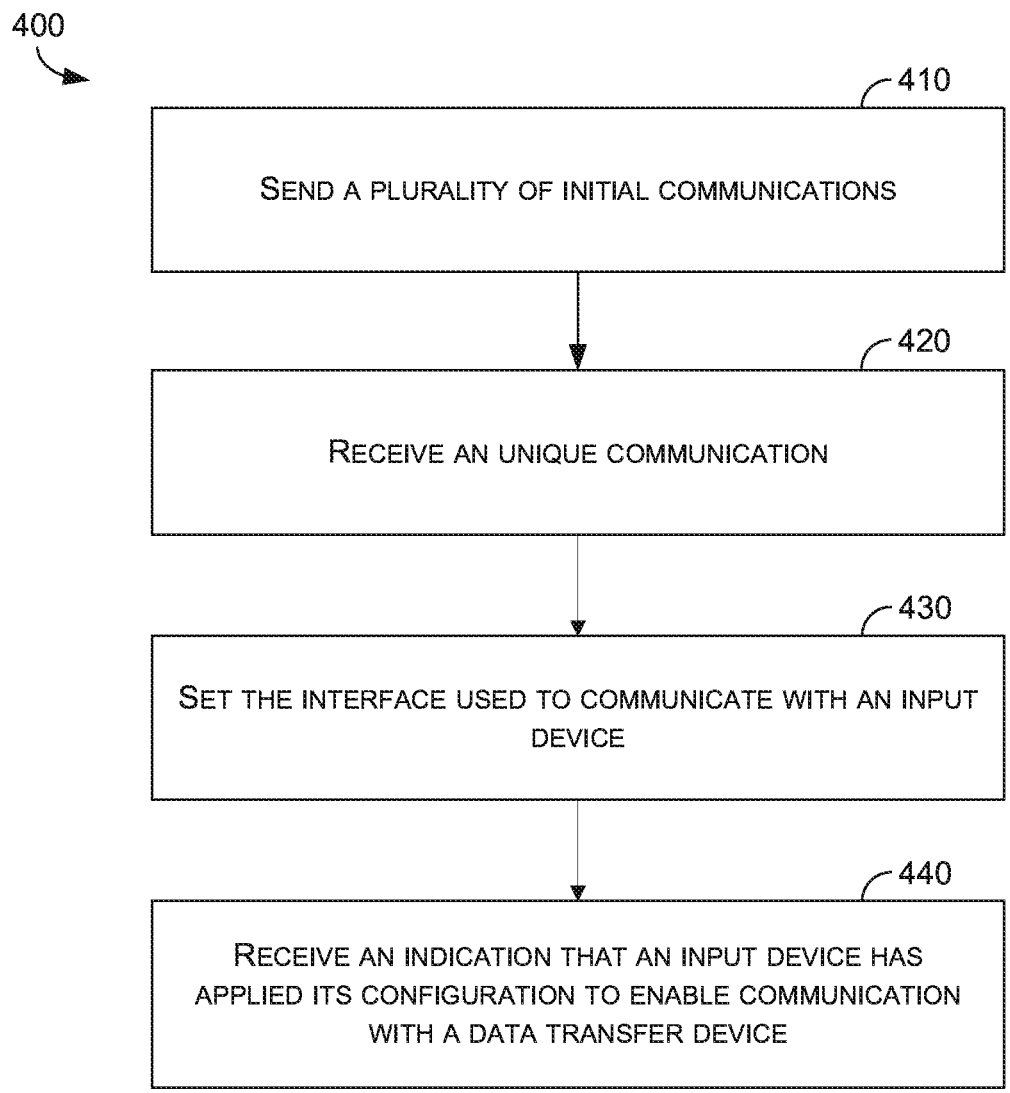
FIG. 4 depicts a block diagram showing an exemplary process of configuring an input device using a data transfer device, in accordance with an embodiment of the present invention.

FIG. 4 is a block diagram of a method 400 of configuring an input device, such as the input device 114 shown in FIG. 1, using a data transfer device 102, such as the data transfer device 102 shown in FIG. 1, in accordance with an embodiment of the present technology. The data transfer device 102 may comprise the adapter component 104 configured to enable communication with the input device 114 in a data format supported by input device 114 and with the host device 116 in a data format recognized by the host device 116, the configuration settings 118 used to enable communication with the host device 116 in a data format recognized by the host device 116, and a logic component 122, among other possible combinations and configurations of components.

At block 410, the data transfer device 102 may send initial communications to the input device 114 in communication with the data transfer device 102. For example, sending, by the data transfer device, a plurality of initial communications to the input device. The data transfer device 102 may be configured to send initial communications to the input device 114. Each initial communication may comprise handshake packets as described herein.

At block 420, the data transfer device 102 may receive a unique communication from the input device 114. For example, receiving, in response to the plurality of initial communications, an unique communication indicating that a communication channel with the input device is open. In some embodiments the unique communication may be an acknowledgement as described herein. The data transfer device 102 may be configured to receive, in response to the initial communications, an acknowledgement indicating that a communication channel with the input device 114 is open.

At block 430, the data transfer device 102 may setup the interface used to communicate with the input device 114. For example, sending to the input device the configuration settings used by the data transfer device to communicate with the input device. In some embodiments, the data transfer device 102 may be configured to communicate, to the input device 114, the interface 112 used by the data transfer device 102 to communicate with the host device 116.

At block 440, the data transfer device 102 may receive an indication that the input device 114 has updated the configuration to enable communication with the data transfer device 102. For example, receiving an indication that the input device has applied the configuration settings to mount a communication interface between the data transfer device and the input device from a plurality of available communication interfaces stored on the input device. In some embodiments, the data transfer device 102 may be configured to receive an indication that the input device 114 has updated the configuration to mount the interface from available communication interfaces stored on the input device 114 to thereby enable communication with the data transfer device 102.

Figure 5:
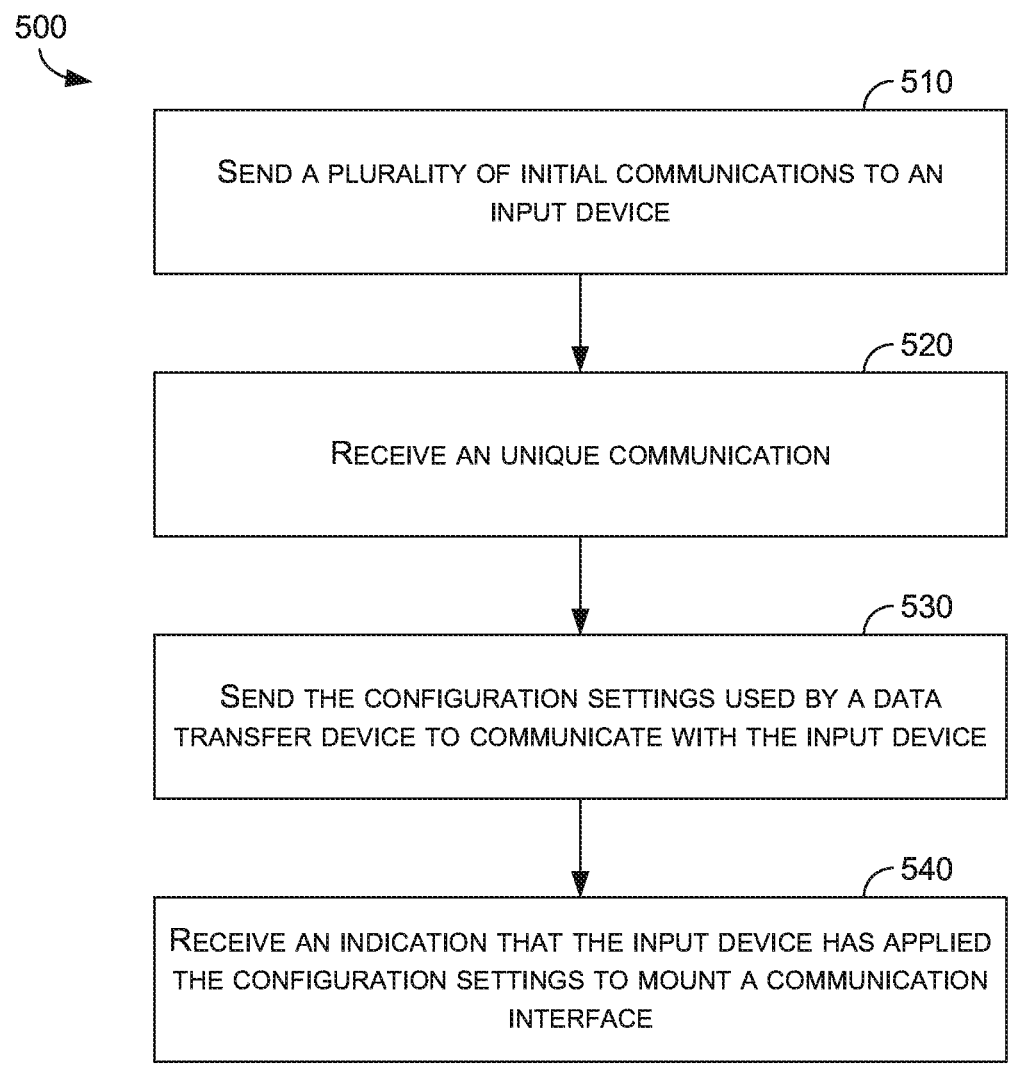
FIG. 5 depicts a block diagram showing an exemplary method for interfacing a data transfer device to an input device, in accordance with an embodiment of the present invention.

Turning to FIG. 5, a block diagram showing an exemplary method 500 for interfacing a data transfer device to an input device. The data transfer device described in FIG. 5 may in some embodiments be the data transfer device 102 shown in FIG. 1, in accordance with an embodiment of the present technology. The data transfer device 102 may comprise the adapter component 104 configured to enable communication with the input device 114 in a data format supported by input device 114 and with the host device 116 in a data format recognized by the host device 116, the configuration settings 118 used to enable communication with the host device 116 in a data format recognized by the host device 116, and a logic component 122, among other possible combinations and configurations of components. The input device described in FIG. 5 may also be, in some embodiments, be the same input device 114 shown in FIG. 1, in accordance with an embodiment of the present technology.

At block 510, the method 500 includes sending a plurality of initial communications to an input device 114. For example, at block 510 the method 500 may include sending, by the data transfer device 102, a plurality of initial communications to the input device 114. The initial communications sent by the data transfer device 102 may be the initial communications described herein at the block 202 of FIG. 2.

At block 520, the method 500 includes receiving an unique communication. For example, at block 520, the method 500 may include receiving, in response to the plurality of initial communications, an unique communication indicating that a communication channel with the input device 114 is open. The unique communication may be an unique communication (e.g., an acknowledgement) as described herein at block 204 of FIG. 2.

At block 530, the method 500 includes sending the configuration settings 118 used by a data transfer device 102 to communicate with the input device 114. For example, at block 530, the method 500 may include sending to the input device 114 the configuration settings 118 used by the data transfer device 102 to communicate with the input device 114. The configuration settings 118 may be used to mount the communication interface, described herein.

At block 540, the method 500 includes receiving an indication that the input device 114 has applied the configuration settings 118 to mount a communication interface. For example, at block 540, the method 500 may include receiving an indication that the input device 114, has applied the configuration settings 118 to mount a communication interface between the data transfer device 102 and the input device 114 from a plurality of available communication interfaces stored on the input device 114.

The present disclosure may be implemented, at least in part, as a method, a system, or a computer-program product. Accordingly, certain embodiments disclosed herein may take the form of hardware, or may be represented as a combination of software and hardware, or may be represented as a computer-program that includes computer-useable instructions embodied on one or more computer-readable media. The subject matter hereof may also be implemented as hard-coded into the mechanical design of computing components or may be built at least partially into a data transfer device 102 used for providing a communication link between the input device 114 and the host device 116.

Computer-readable media may include volatile media, non-volatile media, removable media, and non-removable media, and may also include media readable by a database, a switch, or various other network devices. Network switches, routers, and related components are conventional in nature, as are methods of communicating using the same, and thus, further elaboration is not provided here. By way of example, and not limitation, computer-readable media may comprise computer storage media or non-transitory communications media.

Computer storage media, or machine-readable media, may include media implemented in any method or technology for storing information. Examples of stored information include computer-useable instructions, data structures, program modules, or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, or permanently, and are not limited to the examples provided herein.

Figure 6:
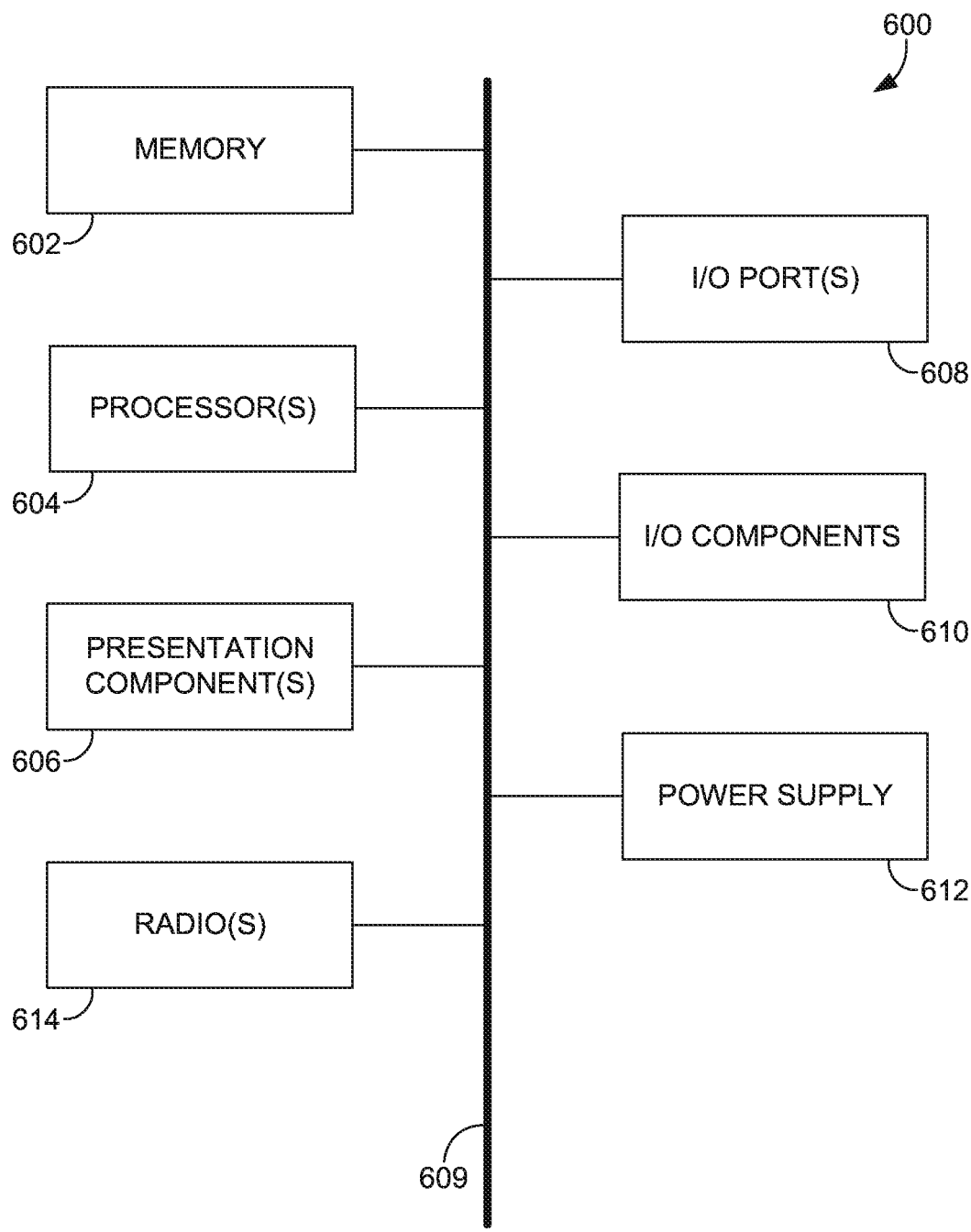
FIG. 6 is an illustration of a block diagram representing an exemplary computing environment suitable for implementing various functions and embodiments; in accordance with an embodiment of the present invention.

FIG. 6 is an illustration of a block diagram representing an example computing environment suitable for implementing various functions and embodiments described in the present invention. It should be noted that although some components depicted in FIG. 6 are shown in the singular, they may be plural, and the components may be connected in a different, including distributed, configuration. For example, computing device 600 might include multiple processors or multiple radios. The computing device 600 shown in FIG. 6 includes a bus 609 that may directly or indirectly connect various components of the computing device 600 together, including memory 602, processor(s) 604, presentation component(s) 606 (if applicable), radio(s) 614, input/output (I/O) port(s) 608, input/output (I/O) component(s) 610, and power supply 612.

The memory 602 may take the form of any of the memory components described herein. Thus, further elaboration will not be provided here, but it is contemplated that memory 602 may include any type of tangible medium that is capable of storing information, such as a database. A database may include any collection of records, data, or other information. In one embodiment, memory 602 may constitute a set of computer-executable instructions that, when executed, facilitate various functions or steps associated with the subject matter described herein. These instructions may be referred to herein as "instructions" or an "application" for short. The processor(s) 604 shown in FIG. 6 may actually be multiple processors that may receive instructions and process them accordingly. The presentation component 606 may include a display, a speaker, a screen, a portable digital device, or other components that can present information through visual, auditory, or other tactile cues (e.g., a display, a screen, a lamp, a light-emitting diode ("LED"), a graphical user interface ("GUI"), or even a lighted keyboard).

The radio(s) 614 may facilitate communication with a network, and may additionally or alternatively facilitate other types of wireless communications, such as Wi-Fi, WiMAX, LTE, Bluetooth, or VoIP communications, among other wireless communication protocols. In various embodiments, the radio 614 may be configured to support multiple technologies, or multiple radios may be configured and utilized to support multiple technologies.

The input/output (I/O) ports 608 may take a variety of forms. Example I/O ports may include a USB jack, a stereo jack, an infrared port, a firewire port, or other proprietary communication ports. The input/output (I/O) components 610 may include one or more keyboards, microphones, speakers, touchscreens, or any other item useable to directly or indirectly input data into the computing device 600. The power supply 612 may include batteries, generators, fuel cells, or any other component that may act as a power source to supply power to computing device 600 and to any other sensor components described herein. For the purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

In conclusion, many different arrangements of the various components depicted, as well as components not shown, are possible without departing from the spirit and scope of embodiments of the present disclosure. Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A data transfer device, comprising:
an adapter component attachable to an input device and to a host device;
a configuration component that stores configuration settings to enable communication with the input device, and
a logic component,
wherein the data transfer device is configured to:
send a plurality of initial communications to the input device,
receive, in response to the plurality of initial communications, an unique communication indicating that a communication channel with the input device is open,
send to the input device the configuration settings used by the data transfer device to communicate with the input device, and
receive an indication that the input device has applied the configuration settings to mount a communication interface between the data transfer device and the input device from a plurality of available communication interfaces stored on the input device.

2. The device of claim 1, wherein the unique communication comprises a specific data configuration associated with the plurality of initial communications.

3. The device of claim 1, wherein the communication interface comprises the configuration settings.

4. The device of claim 1, wherein the configuration settings comprise one or more of baudrate, parity, databits, and start and stop bits.

5. The device of claim 1, wherein the data transfer device implements one or more levels of a communication protocol associated with the communication interface between the data transfer device and the input device.

6. The device of claim 1, wherein the data transfer device, following the receipt of the indication that the input device has applied the configuration settings, is further configured to:
send at least one additional configuration communication to the input device, the at least one additional configuration communication comprising one or more another configuration settings; and
receive from the input device an additional indication that the input device has applied the configuration settings to mount the one or more another configuring settings.

7. The device of claim 1, wherein the adapter component comprises at least one of:
a USB interface,
a Keyboard Wedge PS2 interface,
an RS485 interface,
an IBM46xx interface,
a RS232 interface, and
an Ethernet interface.

8. The device of claim 1, wherein the communication interface comprises a hardware layer and a software layer between the data transfer device and the input device.

9. The device of claim 1, wherein the logic component comprises:
at least one processor and at least one memory, or
a field-programmable gate array (FPGA).

10. The device of claim 1, wherein the input device comprises a scanner configured for scanning machine-readable indicia, and wherein the data transfer device is non-integrally formed with the scanner.

11. The device of claim 10, wherein the data transfer device, following the receipt of the indication that the input device has applied the configuration settings, is further configured to exchange data with the input device, wherein the data comprises at least scanned label data.

12. A method for interfacing a data transfer device to an input device, the method comprising:
sending, by the data transfer device, a plurality of initial communications to the input device;
receiving, in response to the plurality of initial communications, an unique communication indicating that a communication channel with the input device is open;
sending to the input device configuration settings used by the data transfer device to communicate with the input device; and
receiving an indication that the input device has applied the configuration settings to mount a communication interface between the data transfer device and the input device from a plurality of available communication interfaces stored on the input device.

13. The method of claim 12, wherein the unique communication comprises a specific data configuration associated with the plurality of initial communications.

14. The method of claim 12, wherein the configuration settings comprise one or more of baudrate, parity, databits, and start and stop bits.

15. The method of claim 12, wherein the data transfer device comprises an adapter component attachable to the input device and to a host device, and wherein the adapter component comprises at least one of:
a USB interface,
a Keyboard Wedge PS2 interface,
an RS485 interface,
an IBM46xx interface,
a RS232 interface, and
an Ethernet interface.

16. The method of claim 15, wherein the input device is a scanner adapted to scan machine-readable indicia, and wherein the data transfer device is connected to the scanner using the adapter component.

17. The method of claim 16, further comprising, following the receipt of the indication that the input device has applied the configuration settings, exchanging data between the input device and the data transfer device, wherein the data comprises at least scanned label data.

18. A system for a data transfer device to interface with an input device, the system comprising:
a data transfer device configured to send a plurality of initial communications to the input device;
in response to the plurality of initial communications, the data transfer device is configured to receive an unique communication that a communication channel is open with the input device;
the data transfer device is configured to send the configuration settings to the input device to communicate with the input device; and
the data transfer device receives an indication that the input device has applied the configuration settings to mount a communication interface between the data transfer device and the input device from a plurality of available communication interfaces stored on the input device.

19. The system of claim 18, wherein the data transfer device comprises an adapter component attachable to the input device and to a host device, and wherein the adapter component comprises at least one of:
a USB interface,
a Keyboard Wedge PS2 interface,
an RS485 interface, an IBM46xx interface,
a RS232 interface, and
an Ethernet interface.

20. The system of claim 19, wherein the input device is a scanner adapted to scan machine-readable indicia, and wherein the data transfer device is connected to the scanner using the adapter component.

* * * * *